United States Patent [19]

Carey et al.

[11] Patent Number: 5,052,934

[45] Date of Patent: Oct. 1, 1991

[54] PHANTOM FOR EVALUATION OF PROSTHETIC VALVES AND CARDIAC ULTRASOUND PROCEDURES

[75] Inventors: Ronald F. Carey, Columbia; Bruce A. Herman, Rockville; Ronald A. Robinson, Germantown, all of Md.; Harold F. Stewart, Nashville, Tenn.; Richard G. Hoops, Potomac; George H. Douglas, Mt. Airy, both of Md.

[73] Assignee: The United States of America as represented by the Department of Health and Human Services, Washington, D.C.

[21] Appl. No.: 513,269

[22] Filed: Apr. 20, 1990

[51] Int. Cl.⁵ .......................... G09B 23/78; A61B 8/00
[52] U.S. Cl. ................................. 434/268; 128/660.01
[58] Field of Search ................. 128/660.01; 73/866.4, 73/104, 3; 434/268; 600/16, 17

[56] References Cited

U.S. PATENT DOCUMENTS

| | | | |
|---|---|---|---|
| 4,430,893 | 2/1984 | Barkalow | 73/168 |
| 4,489,013 | 1/1990 | Smith et al. | 434/268 |
| 4,493,653 | 1/1985 | Robbins et al. | 434/262 |
| 4,546,642 | 10/1985 | Swanson | 73/37 |
| 4,796,467 | 1/1989 | Burt et al. | 73/168 |

*Primary Examiner*—Francis Jaworski
*Attorney, Agent, or Firm*—Lowe, Price, Leblanc & Becker

[57] ABSTRACT

Apparatus is provided to serve as a phantom for evaluation of prosthetic valves and cardiac ultrasound procedures, wherein a controlled pulsatile flow of a blood-mimicking fluid is passed through a multi-chambered region into which are mounted mitral and aortic valves and adjustably positionable ultrasound transducers. A low friction, drive which involves very low levels of extraneous vibrational inputs, is provided with adjustment of both the volume flow rate of blood-mimicking fluid moved in each operational pulse with further control provided by relatively easily adjusted screws to selectively regulate the systolic and diastolic times of the pulsatile flow generated by a bellows arrangement. Windows made of silicone elastomer material presenting both tissue-equivalent impedance for ultrasound transmission and tissue-equivalent attenuation of the ultrasound are provided in controlled thickness to permit detailed observation of valvular flow parameters of interest, e.g., flow velocity distributions observed in the transesophogeal and apical directions. The apparatus is suitable for clinical ultrasound examination of prosthetic heart valves, the measurement of simulated blood flow velocity profiles, calibration of Doppler ultrasound parameters related to heart valve and related blood flow characteristics, and the fluid mechanical evaluation of cardiovascular devices to compare their performance for comparing competing systems.

20 Claims, 6 Drawing Sheets

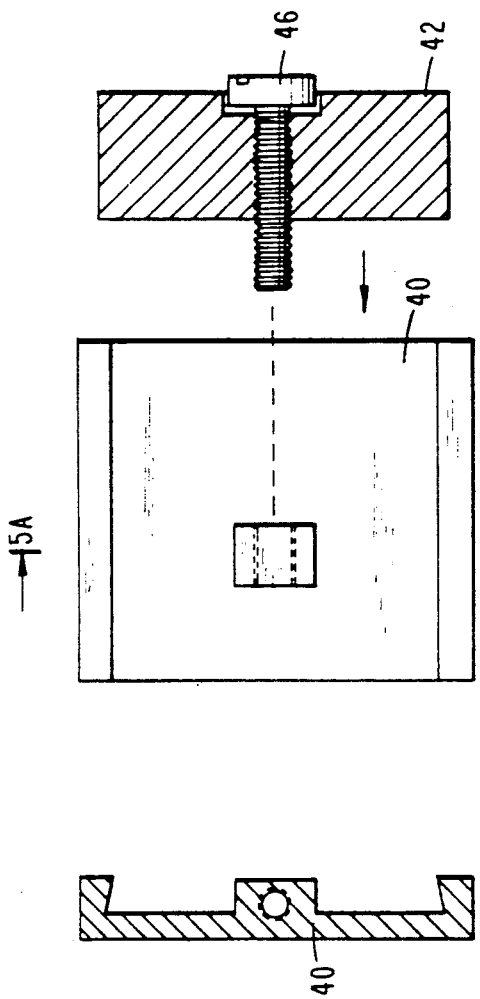
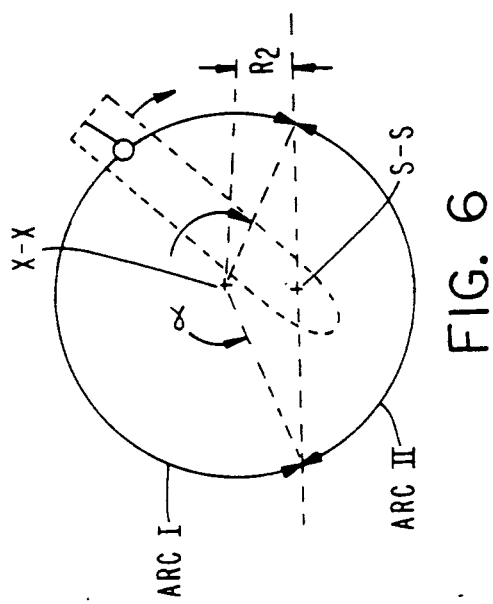
FIG. 5
FIG. 5A
FIG. 6
FIG. 4

PHANTOM FOR EVALUATION OF PROSTHETIC VALVES AND CARDIAC ULTRASOUND PROCEDURES

TECHNICAL FIELD

This invention provides a left heart simulator suitable for clinical ultrasound examination of prosthetic heart valves, the measurement of simulated blood flow velocity profiles, the calibration of Doppler ultrasound parameters related to heart valve performance and related blood flow characteristics, and the fluid-mechanical evaluation of cardiovascular device performance.

BACKGROUND ART

Ultrasound techniques and apparatus are now well established as tools for a variety of medical diagnoses. Ultrasound waves are transmitted from an ultrasound transmitter in a selected direction into a patient's body and, in one type of diagnosis, are scattered therein by changes in the mass density of the tissues encountered, the typical result being a variation in the velocity at which the ultrasound wave is transmitted through different tissues such as bone or cavity interfaces. Some of the ultrasound waves are reflected back to a receiving device used in conjunction with the ultrasound transmitter, and the return signals are processed in any of several known ways to produce useful images of the body structures under study. When an ultrasound wave being transmitted through the body encounters moving elements, e.g., red blood cells in motion, then the returned signal that reaches the signal receiver will have experienced a change in frequency by an amount which corresponds to the magnitude of the velocity component of the moving element along the direction of the incident sound beam. Such a shifting of the frequency of an incident wave due to motion of either the source or of the moving body reflecting the incident wave gives rise to the commonly known Doppler effect.

Clinical ultrasound imaging systems routinely include Doppler processing systems, i.e., data processing and comparisons systems, which enable a user to make estimates of blood velocity in various vessels of a patient's body. See, for example, Hatle, L, and Angelsen, B, "Doppler Ultrasound in Cardiology", Lea and Febiger, Philadelphia, 1982, for a discussion of such well-known clinical Doppler technology.

Blood flow velocity distributions within the chambers of the heart, through and around the heart valves and in the major vessels near the heart, provide highly useful data to cardiologists as they attempt to assess heart and heart valve performance. The hemodynamic performance of a heart valve is reflected in the pressure gradient across the valve when it is open and in the extent of reverse flow, i.e., regurgitation, which occurs when the valve closes. In vivo pressure gradient measurements of this type historically have been made by invasive techniques, e.g., by cardiac catheterization.

High pressure gradients are known to be collated with the functioning of a stenotic valve. This is because the resistance offered by the valve to flow therethrough increases as the opening available for the blood flow becomes smaller due to disease or body deterioration. See, for example, McDonald D. A., "Relation of Pulsatile Pressure to Flow in Arteries", J.Physiol. 127, 533, 1955. Since blood is an incompressible fluid at body pressures, for a particular volume flow rate of the blood the required fluid velocity must increase as the level of stenosis increases. Measurement of blood flow velocity therefore enables a cardiologist to estimate the pressure gradient across the stenotic valve and, hence, the level of stenosis under study.

Doppler ultrasound techniques and apparatus offer a cardiologist a convenient and non-invasive means for estimating the level of stenosis if the requisite blood flow velocity determinations can be made accurately. Furthermore, the volume of blood pumped by the heart in each beat, i.e., the stroke volume, as well as the regurgitant volume, may be estimated by combining analysis of the Doppler data and imaging information. See, for example, Hatle, et al., supra. It is believed that approximately one million such cardiac ultrasound examinations are performed each year in the United States.

Replacement of damaged or otherwise unsound cardiac valves often provides the best solution for the patient, and it is believed that as many as 90,000 such operations are performed world-wide every year. Although such cardiac valve replacements are successful in saving many lives, significant complications are frequently encountered in the implantation of prosthetic valves. Among the most serious complications of this type are thrombo-embolism, hemolysis, post-operative infections, and mechanical failure of the prosthetic valve itself. The most common problem is thrombo-embolism, which is encountered at the rate of about five events per one hundred patient years, the problem being dependent upon the dynamics of blood flow through the valve that is involved. See, for example, Woo, Jr. and Yoganathan, A. P. "In Vitro Pulsatile Flow Velocity and Turbulent Shear Stress Measurements in the Immediate Vicinity of Prosthetic Heart Valves", Life Support Systems 4, pp 47-62, 1986.

It is now generally accepted that understanding of how blood flow patterns cause cell damage, thrombus growth and embolism has become an important aspect of research into improved prosthetic valve design. In addition, further research is also needed in determining the mechanical properties and characteristics of prosthetic valves and such valves are tested by phonocardiographic procedures in which prosthetic or natural valve sounds are captured by sensitive microphones and analyzed to detect valve malfunctions.

It is thus now clear that for ultrasound examinations of both natural as well as prosthetic heart valves, and for both hydrodynamic and acoustic evaluations of prosthetic valves before and after their implantation into a patients body, there is a need for test equipment which can simulate human use and reaction, permit detailed hemodynamic measurements, enable sensitive detection of valve sounds, and allow clinical-type ultrasound examinations. The desired test equipment should include a left heart simulator which produces pulsatile fluid flow in a fluid selected to mimic human blood under a low pressure head of 8-10 mm. Hg. through the mitral valve to fill a left ventricular cavity, the fluid being then pumped through an aortic valve within the pressure range simulating that of the human arterial system, i.e., typically 120 mm. Hg. peak systolic to 80 mm. Hg. end diastolic.

It is very important that the simulated pulsatile flow used in the test equipment be consistent in successive beats, i.e., that the pressure distributions from beat to beat be reproduced consistently. It is also highly desirable to have the stroke volume, the pressure on both sides of the valve, the stroke rate, and the systolic/diastolic time ratio adjustable over a range of physiological valid conditions and that each of these parameters be accurately measurable by standard measurement means. Likewise, in any such test equipment it is highly desirable that there be provided "windows" which enable a user to perform ultrasonic imaging of the valves from positions which approximate anatomical locations and views of clinical interest. It is also highly desirable to have available the facility of test means to determine in detail the fluid velocity distributions downstream of the valves under study for comparison with the Doppler measurements being made through the various ultrasound windows.

The known prior art includes at least some pulse duplicator systems which respond to some aspects of these perceived needs. Such prior art includes a general purpose system produced by The Dynatek Corporation, as described by, for example, Swanson, W. M. and Clark, R. E., "A Simple Cardiovascular System Simulator: Design and Performance", J. Bioeng. 1: 133-145, 1977, which is intended to allow testing of candidate prosthetic valves but includes no capability for performing velocity measurements or ultrasound examination of the valves. Also described by Philpot, E. F., in "In vitro flow Visualization and Pressure Measurement Studies in the Pulmonary Artery", Thesis, Georgia Institute of Technology, Atlanta, June 1985, is a system for visualization of cardiac flows.

U.S. Pat. No. 4,894,013, to Smith et al titled "Anthropomorphic Cardiac Ultrasound Phantom", issued on Jan. 16, 1990, teaches apparatus that includes multiple ultrasound windows for examination of left ventricular flows but includes no mechanism for performing corresponding and contemporaneous fluid velocity field measurements. There are also known a number of Doppler flow phantoms which are intended to permit calibration of ultrasound Doppler systems for flows through straight tubes. These include, for example, Reid, J. M., "Methods of Measuring Performance of Continuous Wave Doppler Diagnostic Equipment", Draft IEC Standard, Subcommittee 29D, Working Group 10, 1983; McDicken, E. N., "A Versatile Test Object for the Calibration of Ultrasonic Doppler Flow Instruments", Ultrasound Medical Biology, 12:245, 1986; Reid, J. M., "Report on Performance Testing of Ultrasonic Doppler Diagnostic Equipment", Draft IEC Report, Technical Committee 87, Ultrasonics Working Group 10, Doppler Devices, 1988 and Boote, E. J. and Zabzebski, J. A., "Performance Tests of Doppler Ultrasound Equipment With a Tissue and Blood Mimicking Phantom", J. Ultrasound Med. 7:137-147, 1988. None of these Doppler flow phantom systems, however, are able to produce flows of a blood mimicking fluid that have characteristics equivalent to those of cardiac blood flow in human beings.

DISCLOSURE OF THE INVENTION

Accordingly, it is a primary object of the present invention to provide apparatus suitable for use as a left heart pulse duplication system which enables a user to produce with a blood mimicking fluid consistent and physiologically correct pressure and flow distribution data.

It is another object of the present invention to provide apparatus suitable for use as a left heart pulse duplication system that enables a user to perform evaluations of clinical Doppler ultrasound systems by comparison of the outputs thereof with directly measured velocity profiles in a controlled pulsatile blood mimicking fluid flow.

It is a further object of the present invention to provide apparatus suitable for use as a left heart pulse duplication system that facilitates reliable evaluation of cardiovascular prosthetic device performance.

These and other related objects of this invention are realized by providing, according to a preferred embodiment of this invention, a multi-chambered, internally multi-ported, anthropomorphic phantom device, filled with a blood-mimicking first fluid for evaluation of prosthetic heart valves and cardiac ultrasound procedures, comprising a first chamber provided with a first chamber inlet port and a first chamber outlet port; a variable-volume second chamber, provided with a second chamber inlet port and a second chamber outlet port, said second chamber being connected to said first chamber with said first chamber outlet port communicating with said second chamber inlet port through a first valve; a third chamber, comprising a third chamber inlet port and a third chamber outlet port, said third chamber being connected to said second chamber with said second chamber outlet port communicating with said third chamber inlet port through a second valve; means for controllably varying a volume of the second chamber to thereby generate a controlled pulsatile flow of said first fluid from said first chamber inlet port through said first chamber, said first valve, said second chamber, said second valve, said third chamber and said third chamber outlet port; and means for detecting a selected parameter of said flow of said blood-mimicking fluid through said multi-chambered phantom device.

BRIEF DESCRIPTION OF DRAWINGS

FIG. 4 is a plan view of a portion of the cam drive mechanism of FIGS. 2 and 3;

FIG. 5 and 5A are plan and sectional views of another portion of the cam drive mechanism of FIGS. 2 and 3;

FIG. 6 is a geometric schematic to explain timing adjustments of the pulsatile flow;

DESCRIPTION OF THE PREFERRED EMBODIMENTS

The apparatus according to the preferred invention as illustrated in FIGS. 1-8 comprises three principal sections that cooperate to provide the user with highly detailed data of interest. These principal sections, broadly speaking, are the drive mechanism to generate a controlled pulsatile flow that can be readily adjusted by the user to suit specific needs in order to simulate human circulatory characteristics under investigation, a working section through which the driven controlled pulsatile flow of a blood-mimicking fluid is directed through valves and chambers that simulate components of the human circulatory system, and elements disposed at the walls of various chambers or within the chambers themselves to detect selected parameters of interest. There may, in addition, in the normal manner be provided ancillary equipment such as reservoirs for the blood mimicking fluid as well as data processing and display equipment to receive, process and display for the users purposes signals generated by the elements that detect the desired parameters.

The various principal sections of the apparatus of this invention will now be discussed and an explanation for the manner of use of the apparatus will be provided thereafter.

Figure 1:
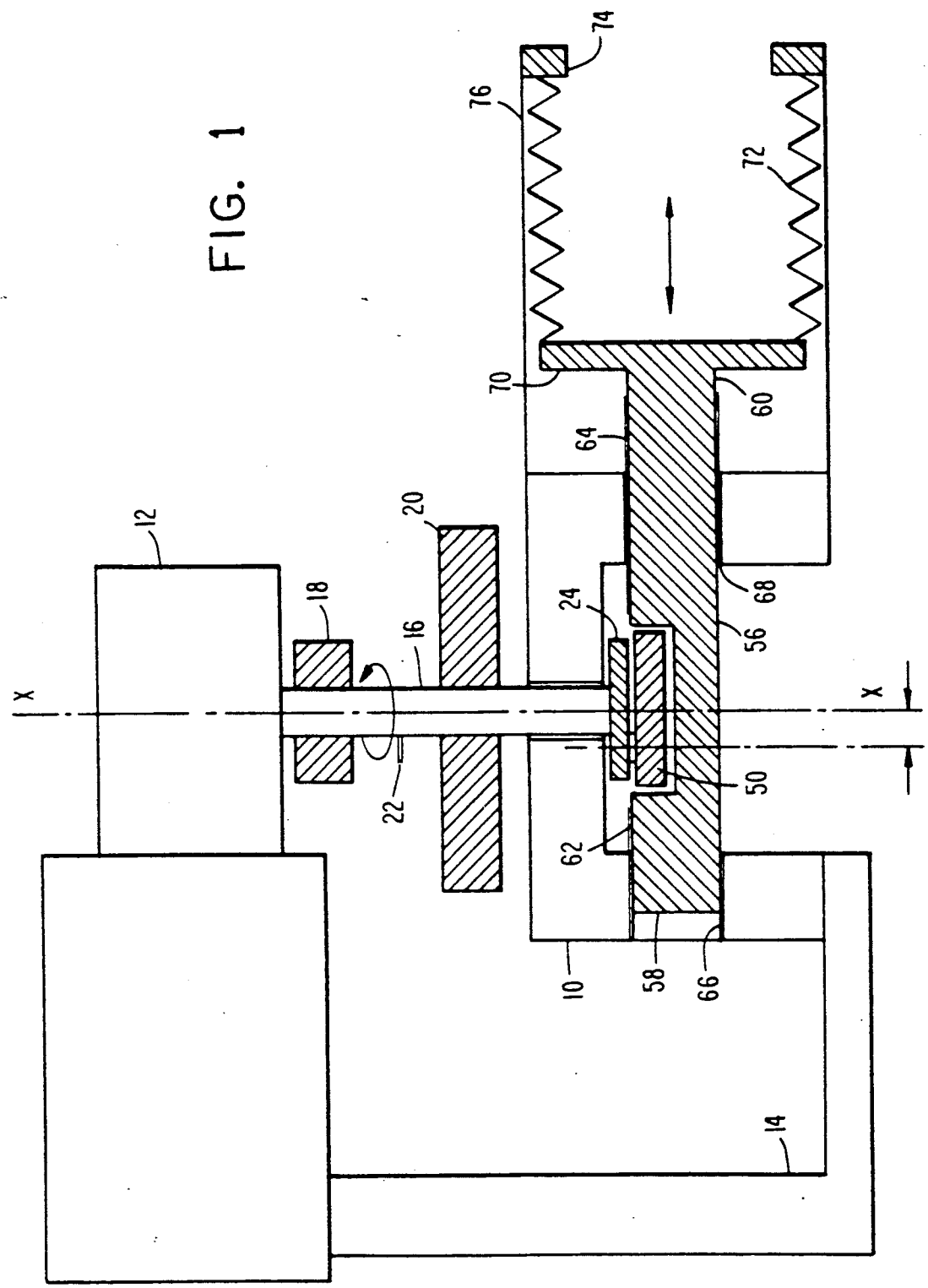
FIG. 1 is a cross-sectional view of a duplicator drive system apparatus according to a preferred embodiment of the present invention.

As best seen in FIG. 1, which is a partially schematic, partially sectioned view of the components that produce the desired controlled pulsatile flow, there is provided a principal drive mechanism mounting block 10 and an electric drive motor 12 both mounted to a schematically illustrated mounting base 14. Drive motor 12 has a distal drive shaft 16 that can be rotated at a controlled speed to provide the principal motivation to drive the elements that convert the rotary motion of shaft 16 into a controlled reciprocating motion to generate the desired pulsatile flow. Provided in conjunction with draft shaft 16 are a conventional optical encoder 18 which, conveniently, provides a feed-back signal of the order of 4,000 pulses per rotation to the power supply to the drive motor for electronic control of the motor speed, a simple fly wheel 20 to ensure smoothness of operation of the apparatus, and a flag 22 which turns through an optical switch of known type (not illustrated) to generate a timing signal suitable for use for reference and other purposes in data acquisition by element yet to be described.

Drive shaft 16 projects through an aperture in support block 10 and is attached at a distal end to a primary rotating drive element 24 held in a rotational bearing 26 supported in a substantially rectangularly shaped primary drive support element 28 sized and shaped to fit into a space defined within drive mounting block 10. It should be noted that for simplicity FIG. 1 illustrates such elements only in schematic form, i.e., certain details illustrated more fully in other figures are deliberately omitted from FIG. 1 to avoid confusion by unnecessary detail. It should also be noted that in FIGS. 2 and 3, simply for purposes of exposition and clarity of presentation, various elements are viewed in what may appear to be an upside-down perspective with regard to FIG. 1.

For purposes of reference the axis about which drive shaft 16 rotates is indicated as X-X in FIG. 1 and it will be treated as being oriented vertically in the following discussion regarding the relative motions of various elements driven by shaft 16. Primary drive element 24 has downwardly depending therefrom a first drive pin 30 which rotates at a predetermined rotation radius $R_1$ with axis X-X as the center of rotation. By exercising control upon the rotational speed of drive shaft 16 the user thus controls the rotational speed of primary drive element 24 and thus the period taken by primary drive pin 30 to make a complete revolution.

Figure 2:
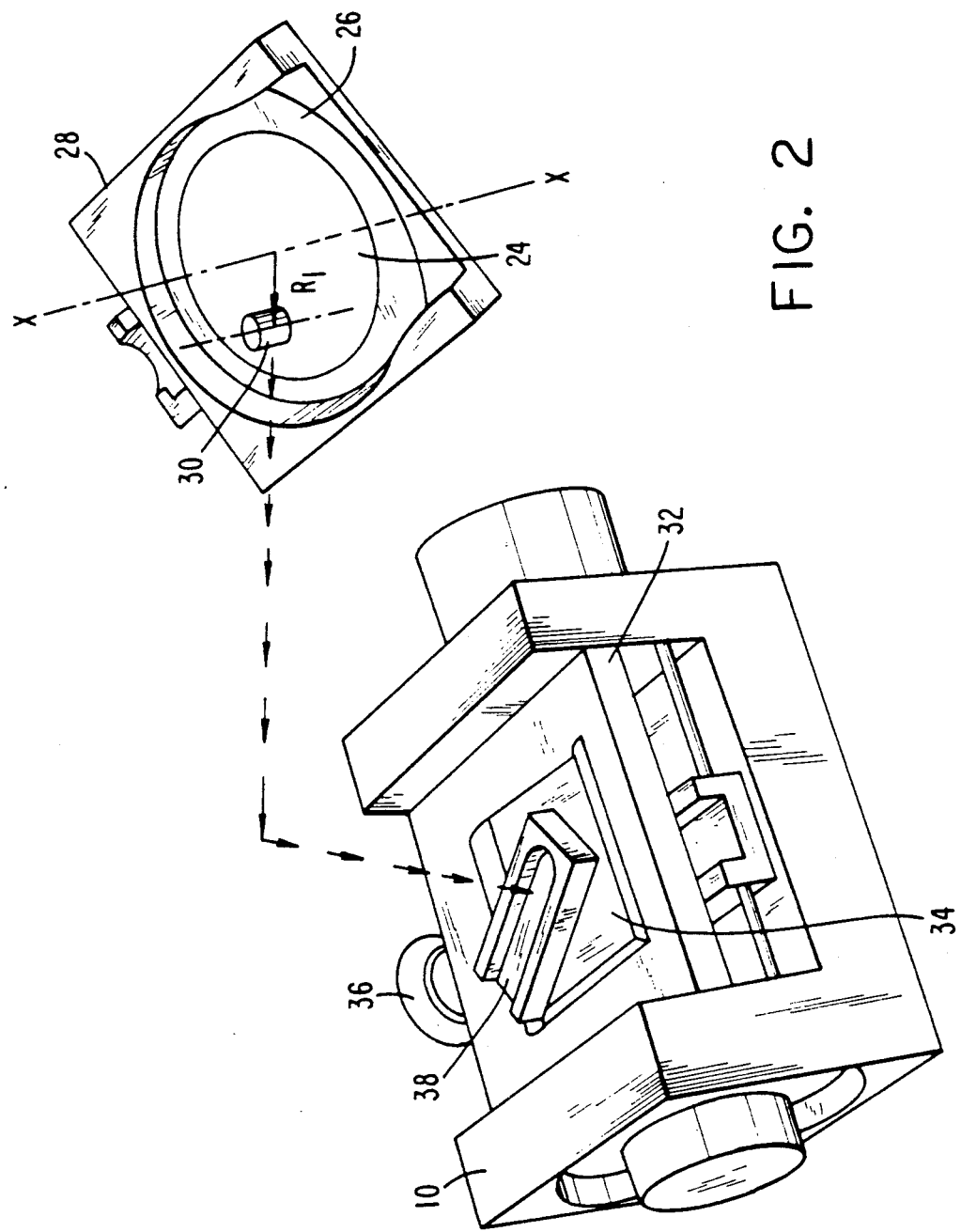
FIG. 2 is an expanded perspective view of a cam-drive system according to a preferred embodiment of the present invention, illustrating a mechanical linkage which enables a user to make independent fine adjustments of the stroke volume and the systolic/diastolic time ratio of a controlled simulated flow of a fluid mimicking blood.
Figure 3:
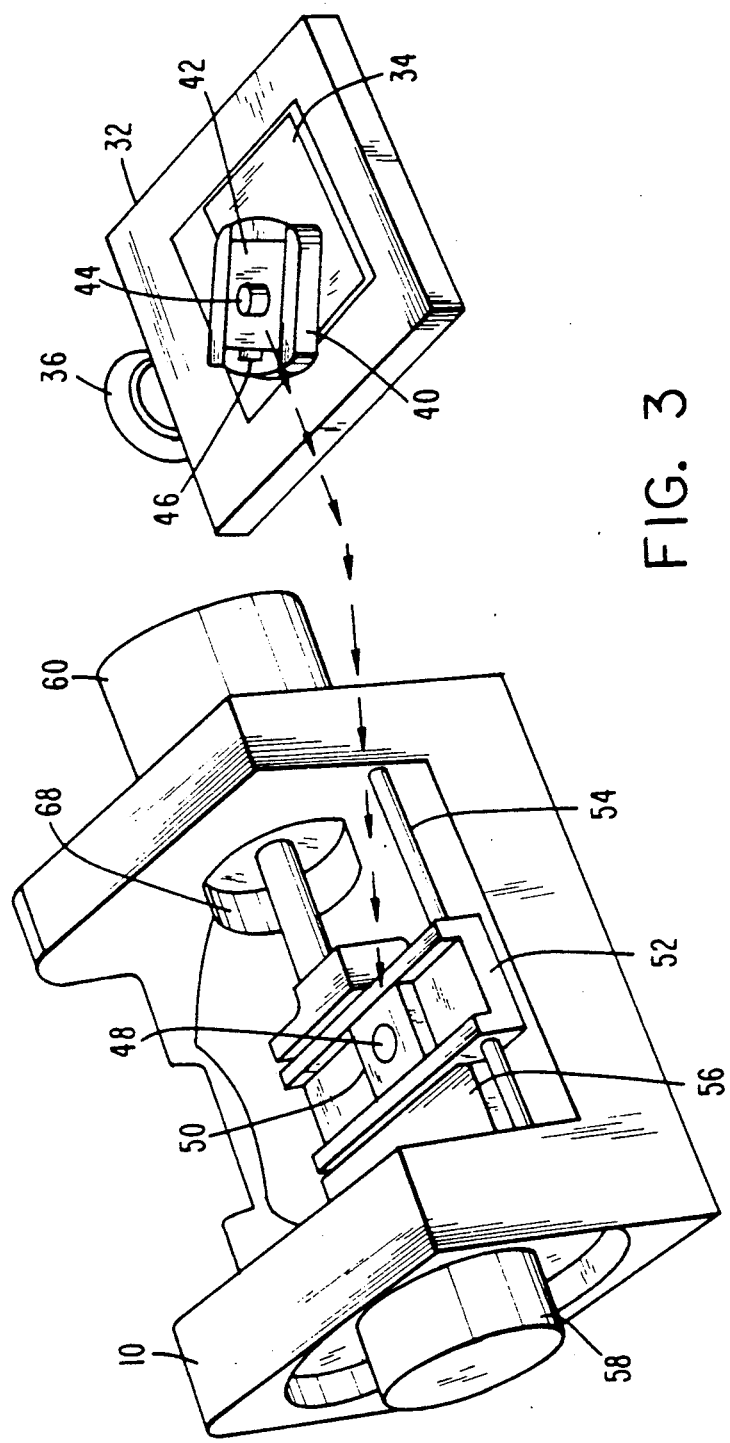
FIG. 3 is a perspective view of the apparatus of FIG. 2 to more clearly illustrate the manner in which the cam and the elements driven thereby are adjustably coupled together for precisely controlled operation of the invention.

Immediately beneath primary drive support element 28 is provided a rotator support element 32 of which various details can be best seen in FIGS. 2 and 3. A plan view of rotator support element 32 (not distal) is provided in FIG. 4 as well. Additional details of various elements controllably supported by rotator support element 32 are provided in FIGS. 5, 5A (sectional view at section A-A in FIG. 5), and FIG. 6. Rotator support element 32 has a generally rectangular annular form with a substantially central rectangular aperture therethrough within which is slidably supported a slide 34 a position of which, in a plane normal to axis X-X is precisely regulated by engagement with a thumb screw 36 in known manner. Therefore, by the user's turning of a distal knob on thumb screw 36 slide 34 is precisely locatable transversely of axis X-X. Slide 34 has formed therein a through aperture (not shown) through which is passed a spindle (also not shown) which attaches on the upper side of slide 34 with a slotted pin-engaging member 38, best seen in FIG. 2. The same spindle, on the other side of slide 34 is connected to a rotator element 40, best seen in FIG. 3. As indicated in FIG. 2, when primary drive support element 28 is positioned about rotator support element 32, with primary drive pin 30 engaged within the slot of pin-engaging slotted member 38, rotative motion of drive shaft 16 will cause rotary motion of pin-engaging slotted member 38 about the axis of the spindle, identified as axis S-S in FIG. 6, there being provided a predetermined offset $R_2$ between axis X-X and axis S-S. See FIG. 6.

Rotator element 40, as best seen in FIG. 3, has two elongate outer sides defining a groove space therebetween to slidably guide and support an adjustably affixable pin base 42 to which is mounted a secondary drive pin 44, best seen in FIG. 3. Adjustable pin base 42 is affixed in a selected position precisely by operation of adjustment screw 46 threadably engaged with adjustable pin base 42 as best understood with reference to FIGS. 5 and 5A.

When the apparatus is fully assembled for use, rotator support element 32 is positioned below primary drive support element 28, with primary drive pin 30 engaging pin-engaging slotted member 38, with secondary drive pin 44 depending onwardly below. Secondary drive pin 44 protozoally fits into an aperture 48 provided in a cam follower element 50 that is supported and slidably guided in a closely fitting horizontal groove in a driven element 52. Driven element 52 is slidably supported in part on a low friction supporting rod 54 mounted horizontally to mounting block 10, as best seen in FIG. 3. Driven element 54 is connected to a flow drive element 56 that has at one end a distal rod like section 58 and at an opposite end another similar rod-like section 60. These rod-like sections 58 and 60 are respectively coated with a low friction material, e.g., Delrin (TM), 62 and 64 respectively, as best seen in FIG. 1. Delrin lined apertures 66 and 68 are provided in mounting block 10 to support the rod-like sections 58 and 60 and closely fitting very low friction and vibration-reducing manner which is a significant aspect of the present invention in terms of the precision of data that can be obtained thereby.

As will be appreciated by persons skilled in the mechanical arts, when motor 12 is operated to provide rotation of shaft 16 and a carefully controlled and monitored rate, it will cause rotation of primary drive support element 28 mounted therebelow and, through primary drive pin 30 engaging pin-engaging slotted member 38 cause rotation of the spindle passing through slide 34 to cause rotation about spindle axis S-S of rotator element 40 and the adjustably mounted secondary drive pin 44 therein as will now, be appreciated by reference to FIG. 6, by the user's control of adjustment screw 46 a selection can be made of the radius at which secondary drive pin 44 rotates with respect to spindle axis S-S. Also, by operation of thumb screw 36, the user can further determine the respective times taken for a complete traverse from one extreme position to the opposite extreme position of secondary drive pin 44 along a line of reciprocatory motion of flow drive element 56. These two times are preferably different, in correspondence to the systolic and diastolic functions of the ventricular heart chamber. These two different periods can be understood with reference to FIG. 6 wherein the obtuse angle "α" which subtends a larger arc, ARC I, corresponds to the longer of the two times in comparison with the complimentary angle subtended by the smaller ARC II. Variation of the distance $R_2$, as best understood with FIG. 6, in practice by operation of thumb screw 36 on the apparatus by the user, enables precise variation of the simulated systolic and diastolic periods, as will be better understood from the following descriptive paragraphs of the mode of operation of the apparatus. Accordingly, when motor 12 is operated a predetermined speed, the mechanism described hitherto causes a reciprocatory motion of flow drive element 56 which, through the rod-like distal end 60 drives a bellows actuating element 70 to and fro as indicated in FIG. 1 to thereby expand and contract a bellows element 72 attached thereto at one end and also attached, at an opposite end, to an attachment flange 74, of a cylindrical protective housing 76.

Flange 74 is sealingly connected to the second principal section of the apparatus according to this invention, i.e., to a multi-chambered zone through which a controlled pulsatile flow of a blood-mimicking fluid passes through prosthetic heart valves for an evaluation of parameters of interest. This section will now be described with reference to FIGS. 7 and 8. The multi-chambered section 100 is formed of a number of sealingly interconnected individual chambers preferably formed of a transparent plastics material, e.g., Plexiglass, to facilitate visual observation of the contents of the chambers during use of the apparatus. Although not illustrated in FIG. 7, it should be understood that there would be a reservoir containing a substantial quantity of a blood-mimicking fluid that is recirculated through the multi-chambered apparatus section 100.

Incoming flow of the blood-mimicking fluid, simulating venous flow from the body to the heart, is received as indicated by arrow "V" into a first chamber 102 through an inlet passage connected by known means to a reservoir of the blood-mimicking fluid. First chamber 102 includes a cavity forming a left atrium 104 which is followed, in the downstream direction of flow, by a mitral valve seat 106 sized and formed to permit proper sealing/seating of a mitral valve 108.

First chamber 102 is sealingly connected to a second chamber 110 that is also provided with a flange connecting to flange 74 and communicating with the inside of bellows 72. The space defined within second chamber 110 serves in part as a simulated left ventricle 112. A portion of first chamber 102 also cooperates with a portion of the second chamber 110 to define a left ventricle tract 114 and serves as an outflow passage for the blood mimicking fluid leaving left ventricle 112.

A third chamber 116 is sealingly connected to first chamber 102, and through it to second chamber 110, to provide a continuing passage to left ventricle tract 114. Third chamber 116 is provided with an aortic valve seat 118 shaped and sized to sealingly seat an aortic valve 120, to the downstream of which is provided an aortic sinus 122. In essence, therefore, third chamber 116 serves as an aortic valve holder. A portion of third chamber 116, downstream of aortic sinus 122, has a cylindrical portion within which it is convenient to locate transducers such as 124 and 126, described more fully hereinbelow, to detect and evaluate assorted flow parameters of interest.

Figure 7:
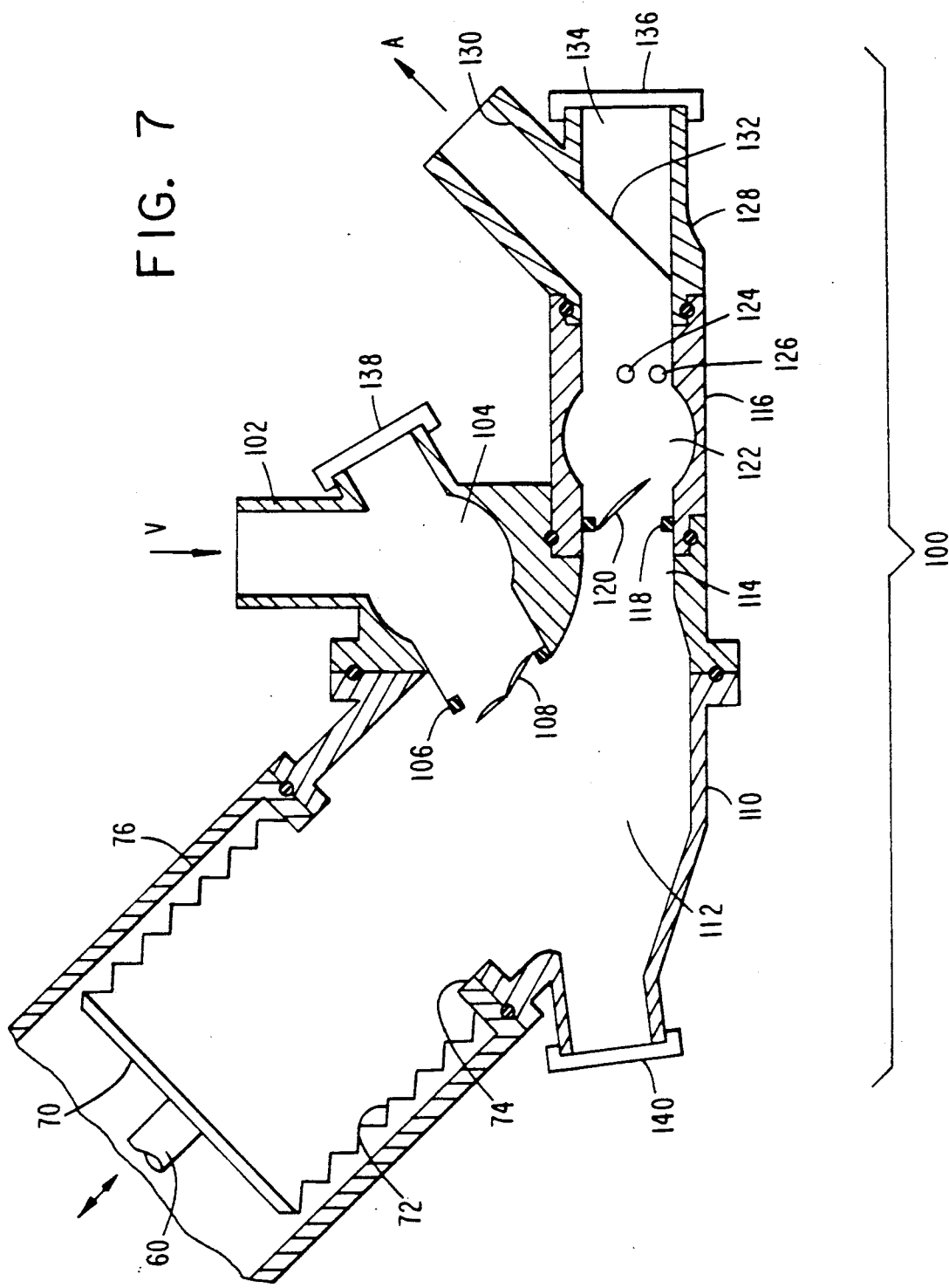
FIG. 7 is a cross-sectional view of that portion of the apparatus according to preferred embodiment of the present invention which constitutes the simulated ventricle, valves and aortic section, with ultrasound scanner windows positioned at selected locations equivalent to the suprasternal notch, transesophogeal, and apical views thereof.

Downstream of transducers 124 and 126, i.e., at the exit end of third chamber 116, there is sealingly fitted a double-branched element 128, of which one branch provides an outflow passage 130 through which a simulated arterial fluid flow passes along the direction of arrow "A", as indicated in FIG. 7. The two branches of element 128 are separated by a flexible membrane 132, preferably formed of Mylar (TM). The second branch 134 of element 128 ends at a window 136 which is formed of a material which closely mimics human tissue in its response to ultrasound and is, preferably, formed from a silicone elastomer material. Space 134 between mylar window 132 and the elastomer window 136 is preferably filled with distilled water. Mylar window 132 provides a non-attenuating path for ultrasound so as to minimize the consequences of any flow disturbance in the flow of the blood-mimicking fluid flow through aortic passage 130.

Additional tissue-mimicking windows, comparable to silicone elastomer window 136, are preferably provided. In FIG. 7, such windows are illustrated at a first chamber behind the mitral valve, i.e., window 138 providing a transesophogeal view, and one at the apex of left ventricle 112, i.e., window 140 providing an apical view. The thickness of each such window is carefully selected to produce a level of ultrasound attenuation based upon signals generated by one or more of transducers 124 and 126, as judged appropriate to be the equivalent of in vivo view.

The third chamber 116, which serves as a valve holder/aortic sinus, and the element containing the aortic channel 130 are independently mounted and are preferably sealed with bayonet-type O-ring seals which allow relative rotation of each of these pieces as well as a quick and convenient change of a candidate aortic valve 120 being tested. One consequence of this is that the transducers 124 and 126 can, in effect, be rotated with respect to the aortic cavity 112 about the direction of fluid flow through aortic valve 120. This enables a very thorough evaluation of the velocity distribution.

As necessary, small mounting ports can be provided at a number of locations in the various chambers for the insertion therethrough of catheter-mounted pressure sensors in conventional manner. Similarly, electromagnetic flow cuffs external to the various chambers can be readily provided and mounted to determine the volume flows, e.g., into the left atrium 112 and out of the aortic channel 130.

In yet another aspect of this invention, provision can be made for direct measurement of fluid velocities independently of the clinical ultrasound estimations of velocity made through signals picked up across the tissue-mimicking windows 136, 138 and 140. Such direct measurements facilitate precise calibration of any clinical Doppler systems being used to make ultrasound evaluations of the flow. It is believed that none of the prior art teaching offers a possibility of such a direct calibration of ultrasound velocity measurements. The present system, therefore, provides a unique facility for valvular assessments to a precision and with a convenience not hitherto available. Such studies are highly facilitated by the provision of two miniature Doppler ultrasound probes serving as the transducers 124 and 126 indicated in FIG. 7.

Figure 8:
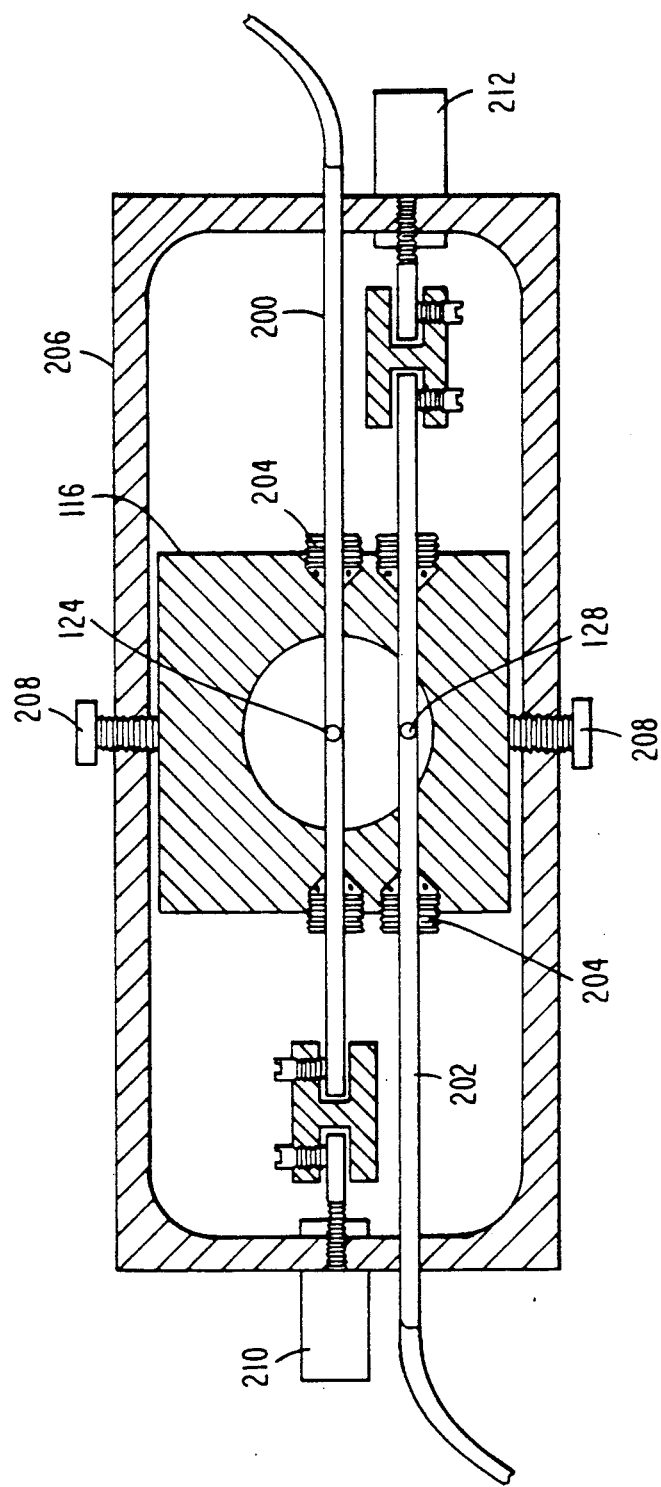
FIG. 8 is an expanded view of the aortic section provided with two Doppler ultrasound probes for detailed ultrasound measurements to be performed therein.

FIG. 8 illustrates one embodiment of the present invention wherein there are provided ultrasound transducers 124 and 128 adjustably mounted to the plexiglass third chamber 116. FIG. 8 illustrates third chamber 116 in transverse cross-section at the location of transducers 124 and 126. Transducers 124 and 126 are mounted respectively on rods 200 and 202 which pass through opposite side walls of third chamber 116 through sealing fittings, e.g., 204, 204. An outside yoke 206 is attachable to outer surfaces of third chamber 116 by adjustable mounting screws 208, 208. Yoke 206 also supports adjustment fittings 210 and 212 which respectively connect to and facilitate transverse movement of rods 200 and 202, to thereby accurately position transducers 124 and 128 within the flow passing through third chamber 116.

It will be appreciated from the description provided hereinabove that the disclosed apparatus permits a user to readily exercise precise control and adjustment of the reciprocating stroke driving bellows 72, to thereby control the total volume of blood-mimicking aspirated past the mitral and aortic valves in each stroke; to separately adjust the timings of the simulated systolic and diastolic strokes; to precisely locate transducers 124 and 126 transversely within the flow of blood-mimicking fluid immediately after the aortic valve; to rotate the dispositions of cooperating transducers 124 and 126 vis-a-vis the aortic valve flow; and to perform conventional ultrasound type measurements through windows such as 136, 138 and 140 specifically selected in thickness and material properties to selectively simulate particular body tissues.

Yet another significant improvement is provided that is effective in reducing cycle-to-cycle or beat-to-beat variations, particularly with the use of bellows for generating pulsatile flow, and consists in the provision of a low friction polymer material, e.g., Delrin (TM) at surfaces where rubbing in the course of sliding motion could otherwise generate chatter or vibration likely to interfere with the precise measurement of parameters of interest. Delrin (TM) or a similar low friction polymer may also be utilized at the rubbing surfaces of pin-engaging slotted member 38, cam follower element 50, and the like.

For purposes of generating simulated circulations that replicate real-life human conditions, the ultrasound windows 136, 138 and 146 may preferably made of a commercially available silicone elastomer material, e.g., Sylgard 170 (TM) produced by Dow Corning Corporation, which provides both a tissue-equivalent impedance for ultrasound transmission as well as tissue-equivalent attenuation of ultrasound controlled by the selected thickness of the window. Suitable blood-mimicking fluids, which are also necessary for simulation of in vivo imaging, are well known in the art, e.g., Boote and Zabzebski, cited earlier.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

We claim:

1. A multi-chambered, internally multi-ported, anthropomorphic phantom device filled with a blood-mimicking first fluid for evaluation of prosthetic heart valves and cardiac ultrasound procedures, comprising:

a first chamber provided with a first chamber inlet port and a first chamber outlet port;

a variable-volume second chamber, provided with a second chamber inlet port and a second chamber outlet port, said second chamber being connected to said first chamber with said first chamber outlet port communicating with said second chamber inlet port through a first valve;

a third chamber, comprising a third chamber inlet port and a third chamber outlet port, said third chamber being connected to aid first and second chambers with said first chamber outlet port communicating with said third chamber inlet port through a second valve;

means for controllably varying a volume of the second chamber, to thereby generate a controlled pulsatile flow of said first fluid from said first chamber inlet port through said first chamber, said first valve, said second chamber, said second valve, said third chamber and said third chamber outlet port with independent control being provided over the pulsatile flow rate and over the systolic and diastolic times of sequential pulses;

means for detecting a selected parameter of said flow of said blood-mimicking fluid through said multi-chambered phantom device; and a closed fourth chamber sharing a common wall with said third chamber between said second valve and said third chamber outlet port and filled with a second fluid, said common wall comprising a flexible material selected to communicate pressure variations between said third and fourth chambers across the shared wall in accordance with a predetermined attenuation property of the flexible material.

2. A phantom device according to claim 1, wherein:

said detecting means comprises at least one detection window comprising a selected tissue-mimicking material, said at least one detection window being disposed with respect to one of said first and second valves to enable detection of said selected parameter of a fluid flow through said selected valve.

3. A phantom device according to claim 1, further comprising:

an additional window provided in said fourth chamber to enable a detection of said selected parameter as communicated across said shared wall from the first fluid in said third chamber to the second fluid in said fourth chamber.

4. A phantom device according to claim 1, wherein:
said first chamber is provided with an atrium portion between said first chamber inlet port and said first valve, and said first valve is formed to function as a simulated mitral valve; and
said third chamber is provided with an aortic sinus between said third chamber inlet and outlet ports, and said second valve is formed to function as an aortic valve.

5. A phantom device according to claim 1, wherein:
said detecting means comprises a plurality of detection windows each comprising a selected tissue-mimicking material of a predetermined thickness, respective ones of said plurality of detection windows being disposed with respect to said first and second valves to enable detection of specific portions of fluid flows through the first and second valves.

6. A phantom device according to claim 5, wherein:
said first chamber is provided with an atrium portion between said first chamber inlet port and said first valve, and said first valve is formed to function as a simulated mitral valve, and
said third chamber is provided with an aortic sinus between said third chamber inlet and outlet ports, and said second valve is formed to function as an aortic valve.

7. A phantom device according to claim 5, wherein:
said detecting means further comprises an ultrasound probe movably located within said third chamber between said second valve and said third chamber outlet port to enable determination of a velocity distribution of said fluid flow through said third chamber.

8. A phantom device according to claim 7, wherein:
said windows each comprise a silicone elastomer material selected to mimic a predetermined human tissue in response to pressure variations of said pulsatile flow of said first fluid as well as corresponding variations of said selected parameter transmitted into said second fluid across said shared wall between said third and fourth chambers.

9. A phantom device according to claim 1, wherein:
said volume-controlling means comprises a variable-throw cam connected to reciprocatingly drive a cam follower, and means for controllably and independently adjusting a forward and a backward duration of the reciprocatory motion of said cam follower; and
said cam follower is connected to a movable portion of a wall of said variable-volume second chamber to thereby generate a controlled time-dependent consistently periodic variation in the volume of the second chamber.

10. A phantom device according to claim 9, wherein:
said cam follower is supported by support means comprising a material selected to present a very low coefficient of friction to the reciprocatory motion of the cam follower.

11. A phantom device according to claim 10, wherein:
said low friction material comprises Delrin (TM).

12. A multi-chambered, internally multi-ported, anthropomorphic phantom device, filled with a blood-mimicking first fluid for evaluation of prosthetic heart valves and cardiac ultrasound procedures, comprising:
a first chamber provided with a first chamber inlet port and a first chamber outlet port;
a variable-volume second chamber provided with a second chamber inlet port and a second chamber outlet port, said second chamber being connected to said first chamber with said first chamber outlet port communicating with said second chamber inlet port through a first valve;
a third chamber, comprising a third chamber inlet port and a third chamber outlet port, said third chamber being connected to said first and second chambers with said first chamber outlet port communicating with said third chamber inlet port through a second valve;
means for controllably varying a volume of the second chamber, to thereby generate a controlled pulsatile flow of said first fluid from said first chamber inlet port through said first chamber, said first valve, said second chamber, said second valve, said third chamber and said third chamber outlet port with independent control being provided over the pulsatile flow rate and over the systolic and diastolic times of sequential pulses; and
means for detecting a selected parameter of said flow of said blood-mimicking fluid through said multi-chambered phantom device,
wherein said third chamber is connected to said second chamber in a manner that permits controlled relative rotary motion therebetween, whereby said second valve is correspondingly rotatable with respect to said second chamber.

13. A phantom device according to claim 12, wherein:
said detecting means comprises at least one detection window comprising a selected tissue-mimicking material, said at least one detection window being disposed with respect to one of said first and second valves to enable detection of said selected parameter of a fluid flow through said selected valve.

14. A phantom device according to claim 12, further comprising:
an additional window provided in said fourth chamber to enable a detection of said selected parameter as communicated across said shared wall from the first fluid in said third chamber to the second fluid in said fourth chamber.

15. A phantom device according to claim 12, wherein:
said first chamber is provided with an atrium portion between said first chamber inlet port and said first valve, and said first valve is formed to function as a simulated mitral valve; and
said third chamber is provided with an aortic sinus between said third chamber inlet and outlet ports, and said second valve is formed to function as an aortic valve.

16. A phantom device according to claim 12, wherein:
said detecting means comprises a plurality of detection windows each comprising a selected tissue-mimicking material of a predetermined thickness, respective ones to said plurality of detection windows being disposed with respect to said first and second valves to enable detection of specific portions of fluid flows through the first and second valves.

17. A phantom device according to claim 12, wherein:

said detecting means further comprises an ultrasound probe movably located within said third chamber between said second valve and said third chamber outlet port to enable determination of a velocity distribution of said fluid flow through said third chamber.

18. A phantom device according to claim 12, wherein:

said windows each comprise a silicone elastomer material selected to mimic a predetermined human tissue in response to pressure variations of said pulsatile flow of said first fluid as well as corresponding variations of said selected parameter transmitted into said second fluid across said shared wall between said third and fourth chambers.

19. A phantom device according to claim 12, wherein:

said volume-controlling means comprises a variable-throw cam connected to reciprocatingly drive a cam follower, and means for controllably in independently adjusting a forward and a backward duration of the reciprocatory motion of said cam follower; and said cam follower is connected to a movable portion of a wall of said variable-volume second chamber to thereby generate a controlled time-dependent consistently periodic variation in the volume of the second chamber.

20. A multi-chambered, internally multi-ported, anthropomorphic phantom device, filled with a blood-mimicking first fluid for evaluation of prosthetic heart valves and cardiac ultrasound procedures, comprising:

a first chamber provided with a first chamber inlet port and a first chamber outlet port;

a variable-volume second chamber, provided with a second chamber inlet port and a second chamber outlet port, said second chamber being connected to said first chamber with said first chamber outlet port communicating with said second chamber inlet port through a first valve, said second chamber being defined in part by a movable wall;

a third chamber, comprising a third chamber inlet port and a third chamber outlet port, said third chamber being connected to said first and second chambers with said first chamber outlet port communicating with said third chamber inlet port through a second valve;

means connected to said movable wall for controllably moving the same and thereby in a predetermined consistently reproducible manner varying a volume of the second chamber, to thereby generate a controlled pulsatile flow of aid first fluid from said first chamber inlet port through said first chamber, said first valve, said second chamber, said second valve, said third chamber and said third chamber outlet port with independent control being provided over the pulsatile flow rate and over the systolic and diastolic times of sequential pulses; and means for detecting a selected parameter of said flow of said blood-mimicking fluid through said multi-chambered phantom device.

* * * * *